United States Patent
Kornienko

(10) Patent No.: US 7,849,613 B2
(45) Date of Patent: Dec. 14, 2010

(54) HEATED HANDLE APPARATUSES AND METHODS USING POWER EQUIPMENT EXHAUST

(75) Inventor: Rodion Kornienko, Chapel Hill, NC (US)

(73) Assignee: Honda Motor Co., Ltd., Tokyo (JP)

(*) Notice: Subject to any disclaimer, the term of this patent is extended or adjusted under 35 U.S.C. 154(b) by 146 days.

(21) Appl. No.: 11/890,602

(22) Filed: Aug. 6, 2007

(65) Prior Publication Data

US 2009/0038184 A1    Feb. 12, 2009

(51) Int. Cl.
*E01H 5/10* (2006.01)
*B60K 13/04* (2006.01)

(52) U.S. Cl. .......................... 37/227; 180/89.2

(58) Field of Classification Search ............... 37/227; 219/204; 180/296, 309, 89.2
See application file for complete search history.

(56) References Cited

U.S. PATENT DOCUMENTS

| | | | |
|---|---|---|---|
| 744,739 A | 11/1903 | Fliess | |
| 1,380,604 A * | 6/1921 | Stumbaugh | 237/12.3 R |
| 1,740,193 A * | 12/1929 | Montgomery | 165/41 |
| 1,984,935 A * | 12/1934 | La Mayeau et al. | 454/141 |
| 2,251,370 A * | 8/1941 | Motzer | 237/12.3 R |
| 3,193,038 A * | 7/1965 | Cronkright | 180/10 |
| 3,989,925 A | 11/1976 | Garner | |
| 4,034,489 A | 7/1977 | Hughes, Jr. | |
| 4,203,423 A * | 5/1980 | Ricci | 126/271.1 |
| 4,324,307 A * | 4/1982 | Schittino et al. | 180/313 |
| 4,547,655 A * | 10/1985 | Kurata et al. | 219/204 |
| 4,848,510 A * | 7/1989 | Ahmed | 180/309 |
| 4,937,429 A | 6/1990 | Hollander | |
| D367,657 S | 3/1996 | Sayles et al. | |
| 6,495,799 B1 * | 12/2002 | Pillsbury et al. | 219/204 |
| 6,927,367 B2 | 8/2005 | Livingstone | |
| 6,998,576 B2 * | 2/2006 | Marquis | 219/204 |
| 7,019,261 B2 * | 3/2006 | Worrell et al. | 219/204 |
| 7,119,304 B2 | 10/2006 | Meyers | |
| 2003/0159317 A1 * | 8/2003 | Dowe et al. | 37/257 |
| 2004/0168540 A1 * | 9/2004 | Weiss | 74/552 |
| 2007/0228028 A1 * | 10/2007 | Starck et al. | 219/204 |

* cited by examiner

*Primary Examiner*—Robert E Pezzuto
*Assistant Examiner*—Abigail A Risic
(74) *Attorney, Agent, or Firm*—Jenkins, Wilson, Taylor & Hunt, P.A.

(57) ABSTRACT

Apparatuses and methods are provided for heating the handle(s) of power equipment using exhaust produced by an internal combustion engine, including a machine powered by an internal combustion engine, an operator grippable handle, with an interior, and a tubular structure routing the exhaust produced by the internal combustion engine to the interior of the handle. One or more adjustable apertures provide regulation of exhaust in communication with the interior of the handle, wherein the heating of the handle is selectably controlled.

42 Claims, 14 Drawing Sheets

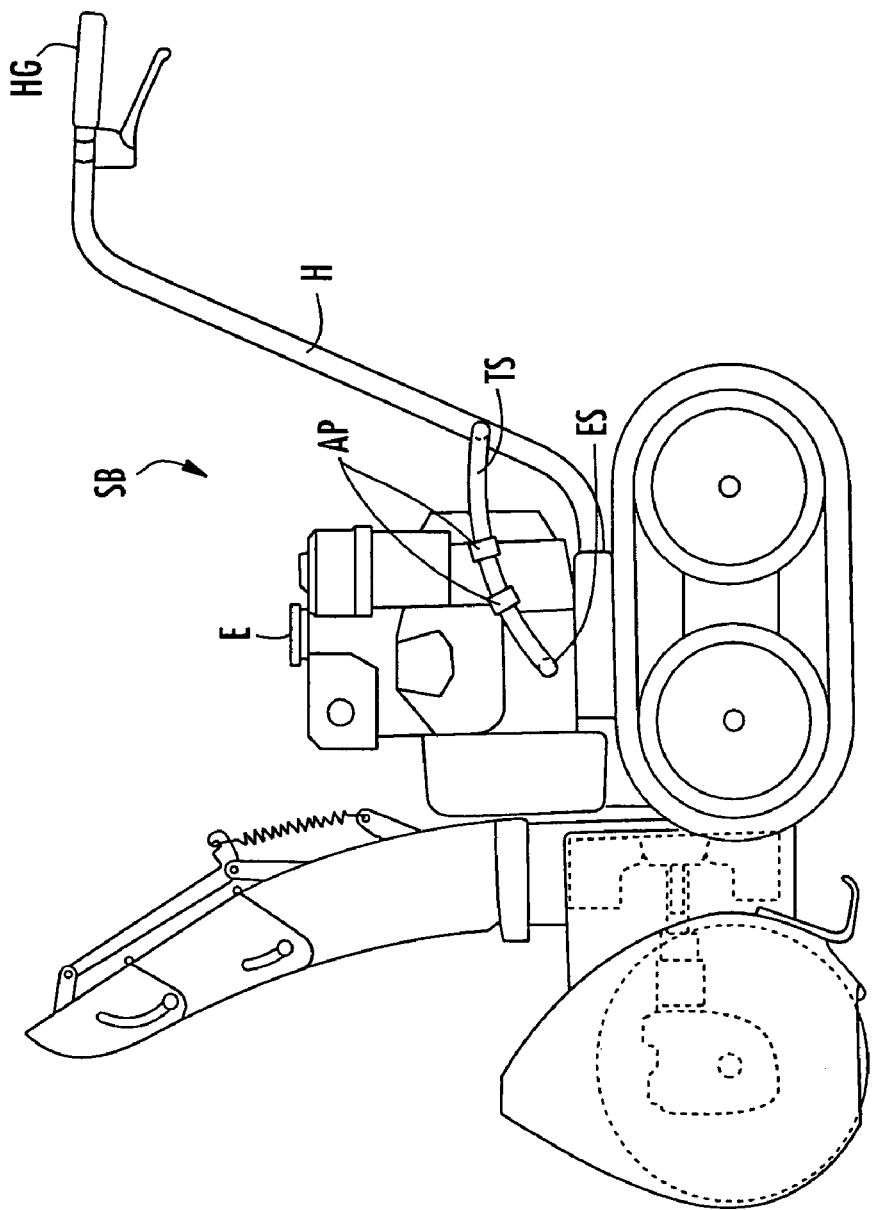

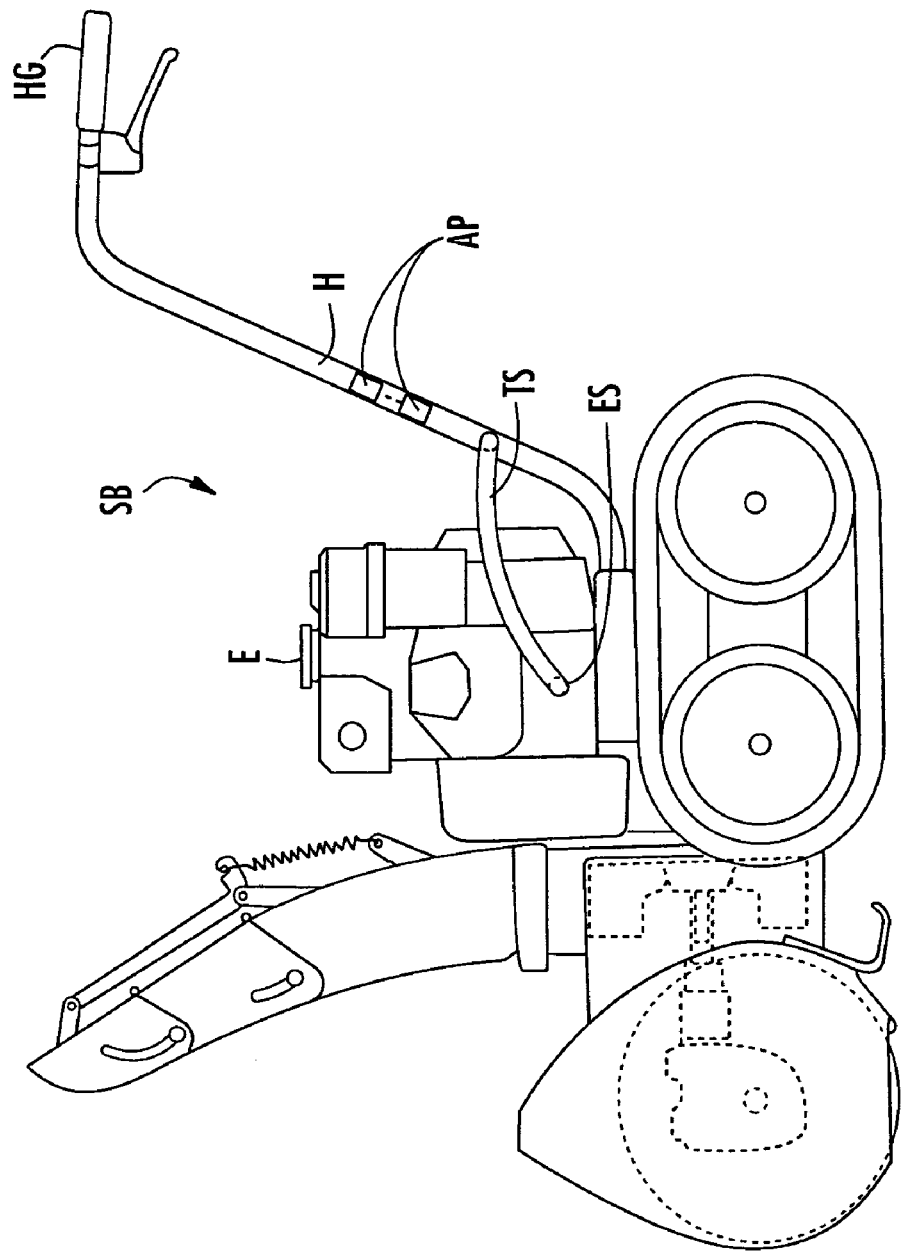

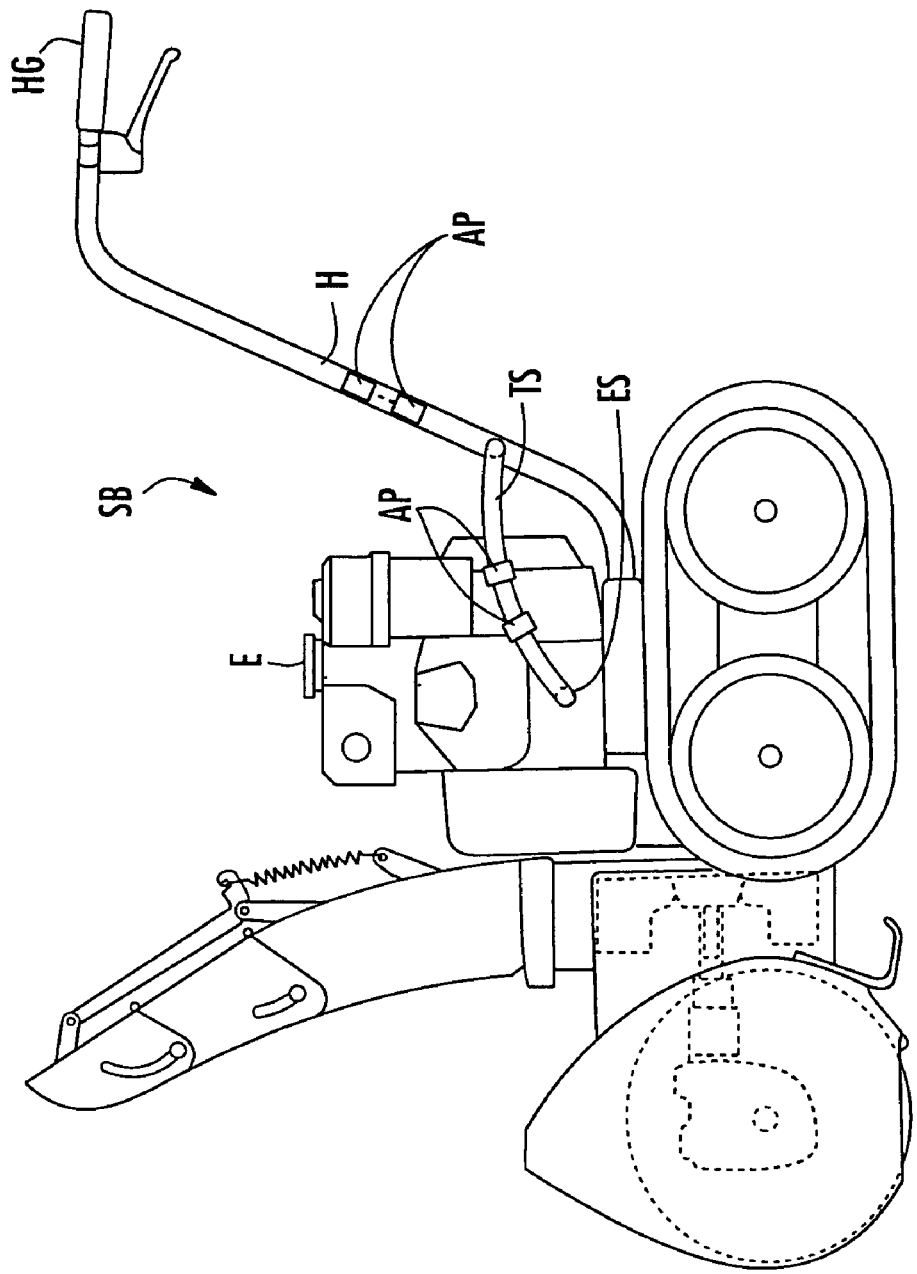

HEATED HANDLE APPARATUSES AND METHODS USING POWER EQUIPMENT EXHAUST

TECHNICAL FIELD

The subject matter disclosed herein relates generally to apparatuses and methods for heating the handle(s) of power equipment, and more specifically to utilizing thermal energy from exhaust to heat the handle(s) of a snowblower by routing the exhaust from the internal combustion engine to the handle(s).

BACKGROUND

Power equipment, particularly snowblowers or snow throwers, are often operated in cold climates or during cold weather. In such conditions the operator is exposed to the elements and can become uncomfortably cold. Currently there are snowblowers equipped with electrically heated handles and grips to heat the handles and mitigate operator discomfort. Other applications of electrically heated handles include all-terrain vehicles, motorcycles, ski mobiles, ice boats, snow shovels and ski poles.

However, it is challenging to effectively control the electrical heating elements for safety and comfort while minimizing power consumption. Further, a snowblower with an electric handle heater requires an alternator-equipped engine. Thus, it would be advantageous to employ a means of heating the handle(s) of a snowblower or other power equipment that did not require an alternator-equipped engine or the use of electrical heating elements.

SUMMARY

According to one aspect, there is an apparatus for heating the handle(s) of power equipment, particularly power equipment operated in cold weather, the apparatus comprising: power equipment, such as a snowblower, an internal combustion engine and an operator grippable handle(s), the handle having an interior space. The apparatus further comprises a tubular structure, more preferably a flexible heat-resistant hose, whereby exhaust produced by the internal combustion engine is directed to the interior of the handle, wherein the thermal energy of the exhaust effectively heats the handle(s).

According to another aspect, the amount of exhaust entering and subsequently passing through the interior of the handle(s) is controlled, either manually or automatically, to regulate the temperature of the handle(s) to prevent overheating and optimize operator comfort. This can be accomplished by opening or closing one or more apertures on the tubular structure or apertures on the handle(s) to control the amount of exhaust directed into the interior of the handle(s).

Yet another aspect includes one or more controllable apertures on the tubular structure or handle(s), whereby exhaust back pressure on the engine is regulated.

Apparatuses are also provided for controlling heat balance along the handle(s) to mitigate the loss of thermal energy as the exhaust travels through the interior of the handle(s) and to ensure even heating of the handle grips. The use of materials with varying heat exchange ratios, the internal geometry of the handle and insulating inserts and coatings are embodiments of the present subject matter capable of providing heat balance along the handle(s).

According to another aspect of the present disclosure, the handle(s) through which the exhaust will be directed will serve as a muffler by way of muffling structures inside the handle(s) that will effectively muffle the engine noise. This feature will eliminate the need for a separate muffler.

It is therefore an object of the present disclosure to provide apparatuses and methods of heating the handle(s) of a snowblower or like power equipment by directing the exhaust produced by the internal combustion engine to the interior space of the handle(s) whereby the thermal energy from the exhaust is effectively utilized to the handle(s).

An object having been stated hereinabove, and which is achieved in whole or in part by the subject matter disclosed herein, other objects will become evident as the description proceeds when taken in connection with the accompanying drawings as best described hereinbelow.

BRIEF DESCRIPTION OF THE DRAWINGS

The full and enabling disclosure of the present subject matter including the best mode thereof to one of ordinary skill in the art is set forth more particularly in the remainder of the specification including references to the accompanying figures in which:

FIG. 1b is a side elevation view of the apparatus to heat the handle(s) of a snowblower as illustrated in FIG. 1a;

FIGS. 4a, 4b and 4c are side elevation views of embodiments of an apparatus to heat the handle(s) of a snowblower, illustrating one or more apertures in a plurality of locations;

FIG. 11 is a cut-away side view of a handle of the snowblower illustrating an embodiment of a muffling structure.

DETAILED DESCRIPTION

Reference will now be made in detail to the presently preferred embodiments of the present subject matter, one or more examples of which are shown in the figures. Each example is provided to explain the subject matter and not as a limitation. Features illustrated or described as part of one embodiment can be used in another embodiment to yield still a further embodiment. It is intended that the present subject matter covers such modifications and variations.

Figure 1A:
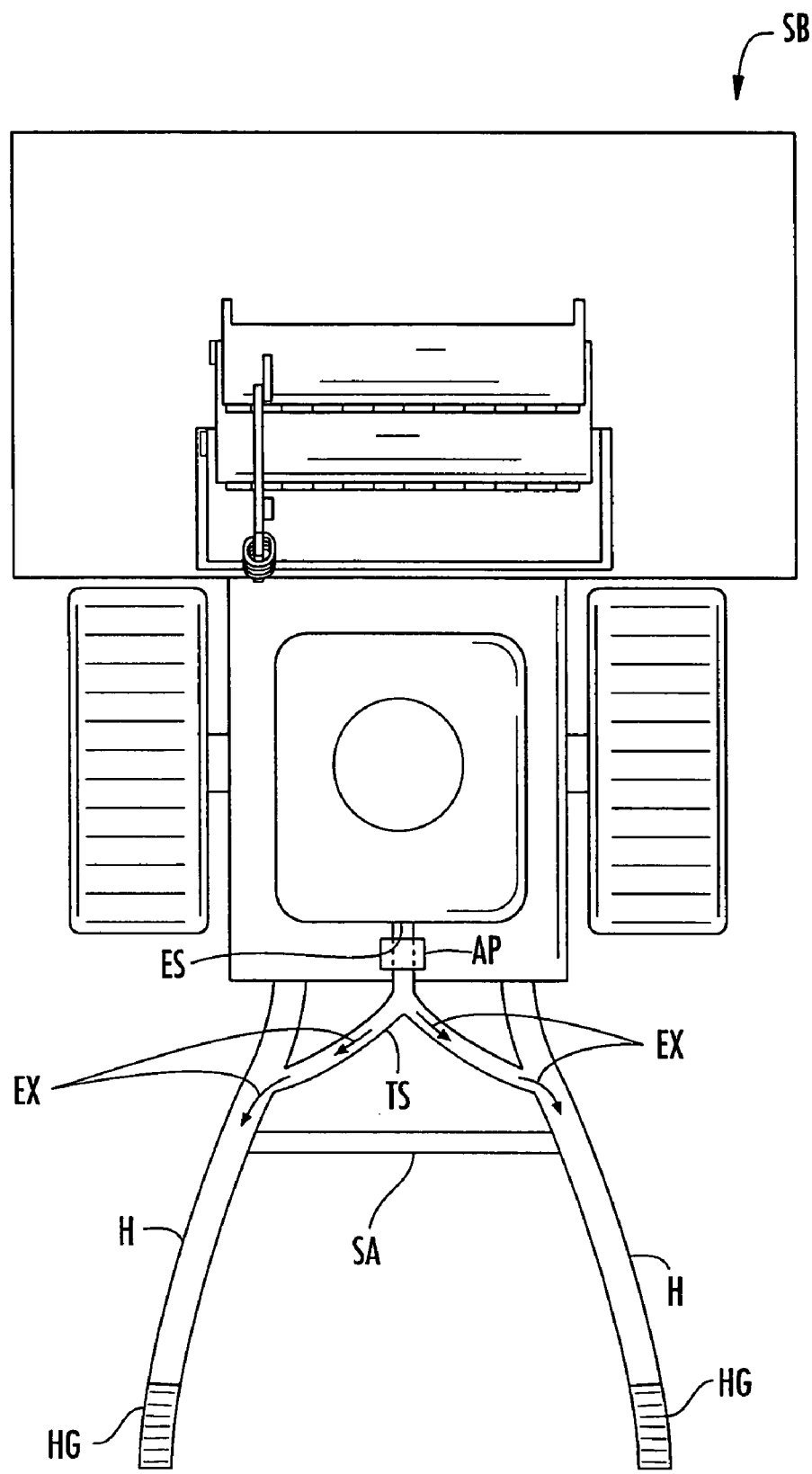
FIG. 1a is a top plan view of an embodiment of an apparatus to heat the handle(s) of a snowblower according to the presently claimed subject matter.
Figure 1B:
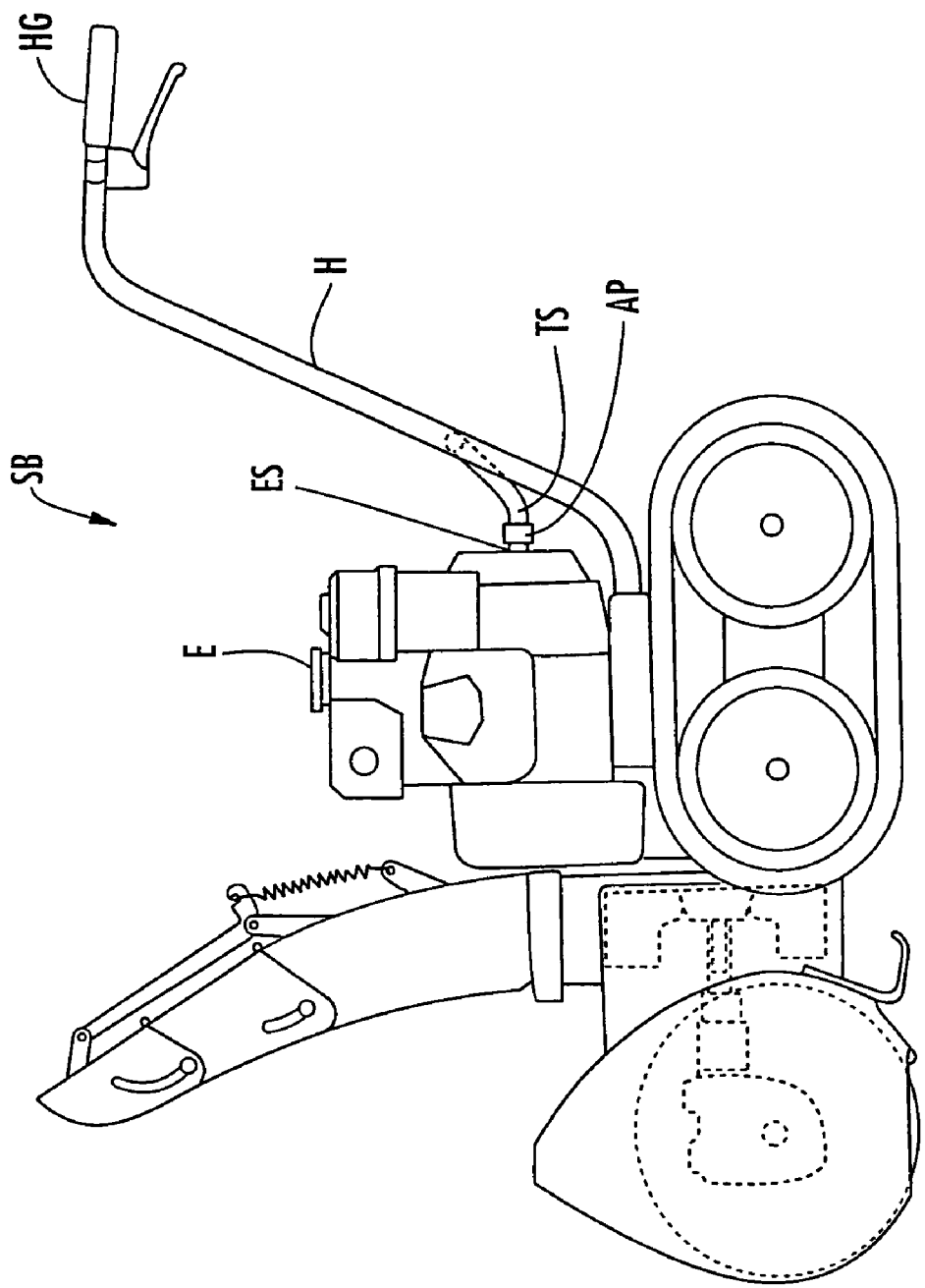

Referring now to FIGS. 1a and 1b, power equipment is generally illustrated by way of example. As one non-limiting example of an implementation of the principles disclosed herein, the power equipment is illustrated as a snowblower, generally designated SB. It can be appreciated, however, that the embodiments disclosed herein are not limited to snowblowers; rather, the embodiments can apply to any suitable power equipment, whether the riding or walk-behind type, such as snowblowers, lawn mowers, tillers, palette trucks, snowmobiles, all-terrain vehicles, motorcycles, small utility vehicles, vehicles for transportation, pavement and construction machines, and the like.

Continuing with the example provided in FIGS. 1a and 1b, snowblower SB is powered by an internal combustion engine E, wherein engine E, when in operation, generates mechanical power to be used in operating snowblower SB as well as exhaust EX, which can be discharged from an exhaust source ES. One or more handles H are provided to allow operator control of snowblower SB, wherein handle H comprises hollow tubing or pipe with an interior space. Handle H further comprises one or more handle grips HG to be gripped by the operator. The present subject matter provides that exhaust EX produced by internal combustion engine E is in communication with the interior space of handle H. Specifically, exhaust EX is directed to the interior space of handle H through a tubular structure TS. One or more apertures AP are configured to control the amount of exhaust EX directed to the interior of handle H.

By directing exhaust EX produced by internal combustion engine E to the interior of handle H the thermal energy contained in exhaust EX is effectively transferred to handle H whereby handle H is heated. Utilizing the thermal energy of exhaust EX to heat or warm handle H is envisioned to improve operator comfort during operation, particularly when operating in a cold environment.

As can be appreciated, the configuration of handle H can vary widely. Accordingly, as illustrated in one embodiment in FIGS. 1a and 1b, handle H comprises two separate handles extending reward from snowblower SB and at an upward angle and terminating at a position to be gripped by the operator for controlling snowblower SB. A support arm SA can extend between the two handles. Handle grips HG can be provided at the terminal end of handles H to be gripped by the operator.

Figure 2:
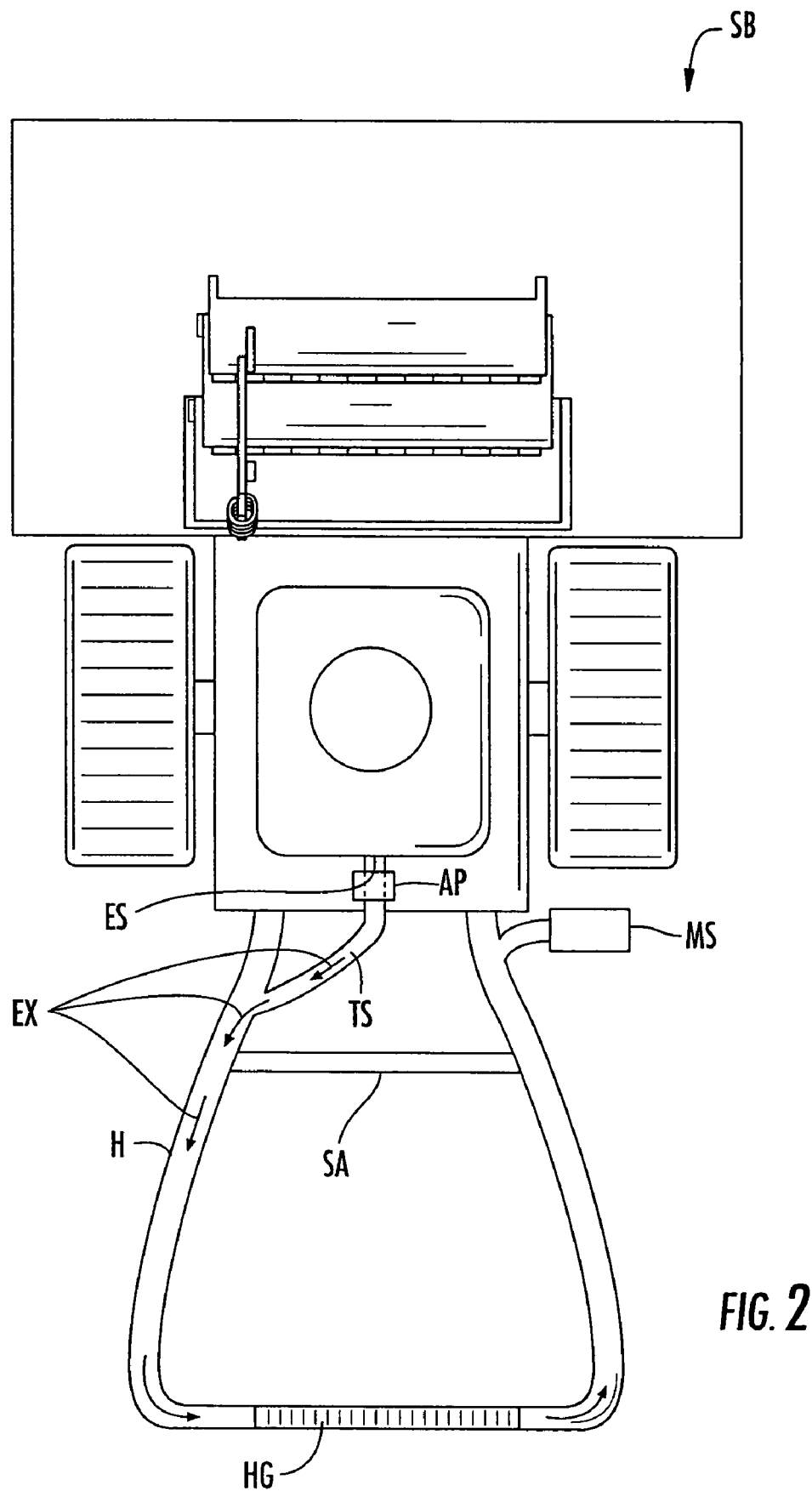
FIG. 2 is a top plan view of another embodiment of an apparatus to heat the handle(s) of a snowblower according to the presently claimed subject matter.

An alternative embodiment of handle H is illustrated in FIG. 2, wherein handle H comprises a continuous hollow pipe forming a substantially U-shaped handle extending reward from snowblower SB with a proximal end section optionally having handle grip HG to be gripped by the operator and two spaced-apart legs to be attached to snowblower SB. The embodiments disclosed herein, however, are not limited to any particular configuration of handle H.

Tubular structure TS directing exhaust EX to the interior of handle H is preferably a flexible heat-resistant hose; however, as can be appreciated by one skilled in the art, tubular structure TS can comprise any apparatus or structure that can effectively direct exhaust EX to the interior space of handle H. In one embodiment, illustrated in FIGS. 1a and 1b, tubular structure TS can attach to the rear portion of engine E and fork into two directions whereby directing exhaust EX from engine E to both handles H. If applied to the U-shaped handle, as illustrated in FIG. 2, tubular structure TS can connect to the rear portion of engine E and direct exhaust EX from engine E to the interior space of one side of the substantially U-shaped handle H, wherein exhaust E is directed around the interior of U-shaped handle H.

Figure 3A:
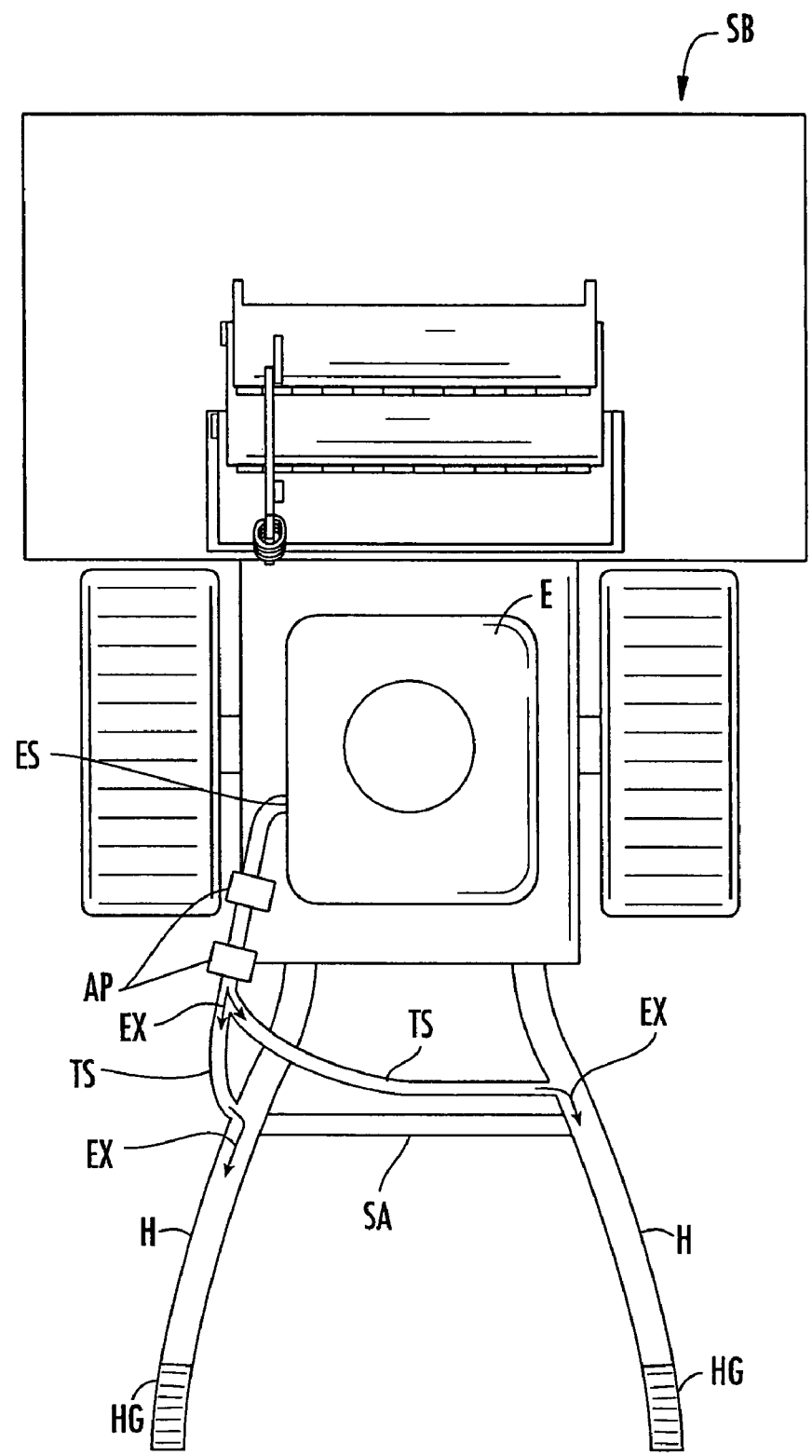
FIG. 3a is a top plan view of another embodiment of an apparatus to heat the handle(s) of a snowblower.
Figure 3B:
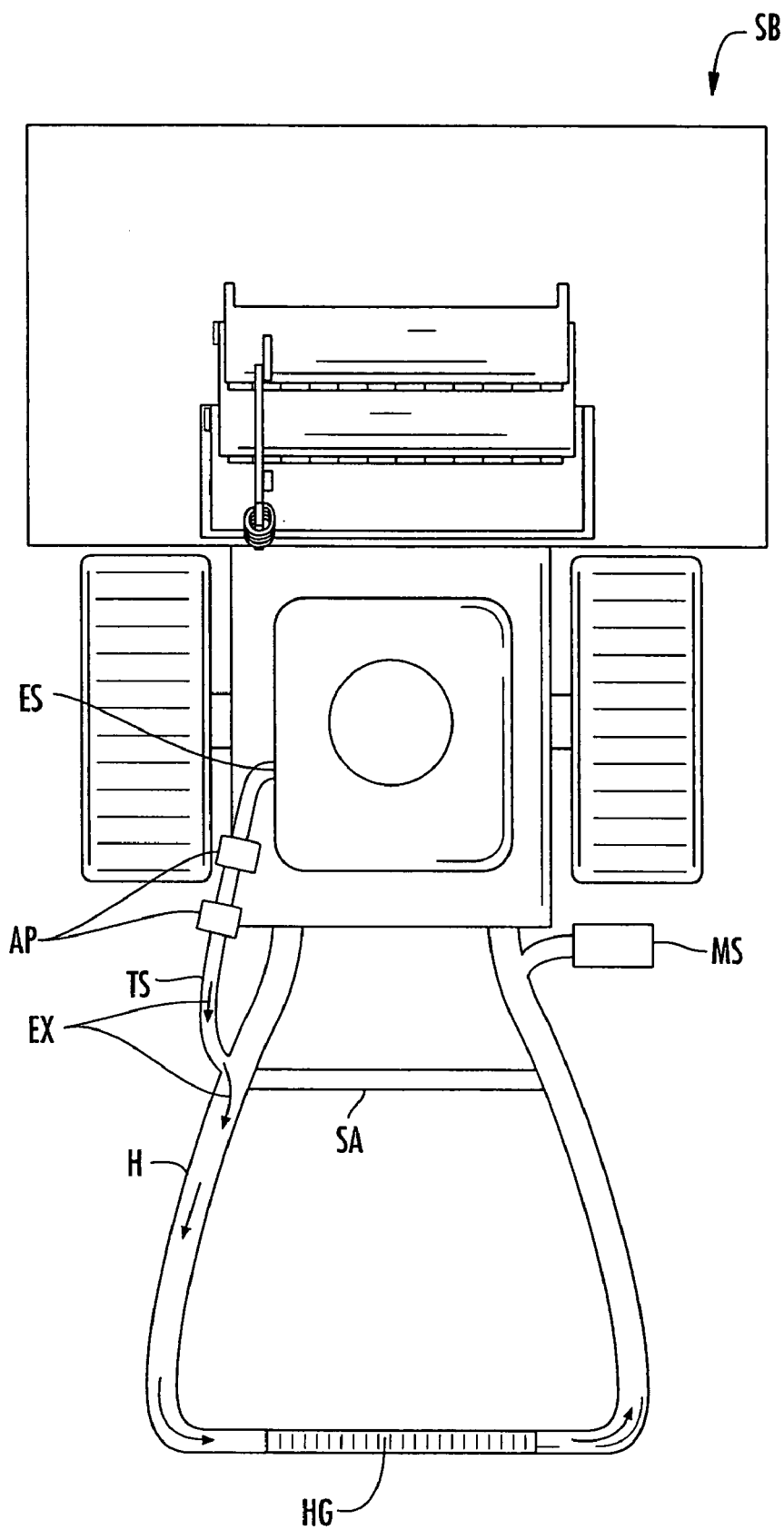
FIG. 3b is a top plan view of another embodiment of an apparatus to heat the handle(s) of a snowblower.

FIG. 3a illustrates yet another embodiment wherein tubular structure TS can attach to a side of engine E and fork into two directions whereby directing exhaust EX produced by engine E to the interior of both handles H. Similarly, tubular structure TS can attach to a side of engine E such that exhaust EX are directed to the interior space of the substantially U-shaped handle H as illustrated in FIG. 3b. However, tubular structure TS can be attached to the engine E in a plurality of locations so long as it effectively directs exhaust EX produced by engine E to the interior of handle H, thus the embodiments disclosed herein are not intended to be limiting.

The present subject matter provides that one or more apertures AP can be included in the apparatus to heat handle H. Apertures AP can be located in a plurality of locations. For example, FIG. 4a illustrates tubular structure TS having one or more apertures AP and FIG. 4b illustrates handle H having one or more apertures AP. Additionally, both tubular structure TS and handle H can have one or more apertures AP as illustrated by FIG. 4c.

Figure 5:
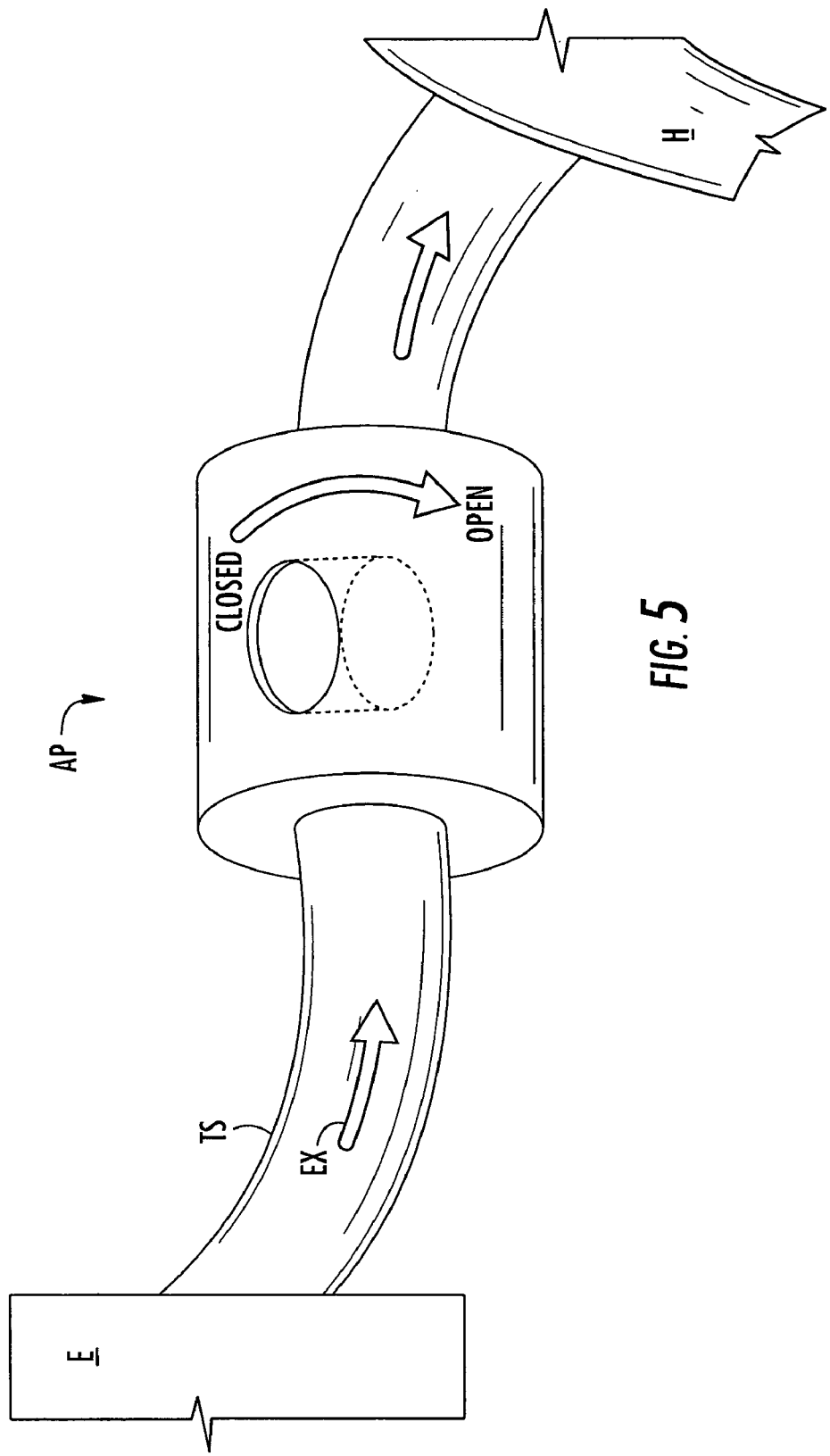
FIG. 5 illustrates a perspective view of an embodiment of an aperture according to FIGS. 4a, 4b and 4c.

FIG. 5 illustrates an embodiment of aperture AP, wherein the amount of exhaust EX directed from engine E to the interior of handle H through tubular structure TS is regulated. Specifically, aperture AP can be rotatably opened and closed to selectably regulate the amount of exhaust EX directed to the interior of handle H. In the closed position aperture AP effectively directs all or substantially all of exhaust EX from engine E to handle H. Alternatively, in the open position aperture AP will allow exhaust EX to escape tubular structure TS prior to entering the interior of handle H. Aperture AP can be rotated to a plurality of positions ranging from fully open to fully closed, wherein the amount of exhaust EX directed from engine E to the interior of handle H ranges from substantially none of exhaust EX produced by engine E to substantially all of exhaust EX produced by engine E. It is also envisioned that aperture AP as illustrated in FIG. 5 can be comprised as part of handle H, as illustrated in FIG. 4b.

Figure 6A:
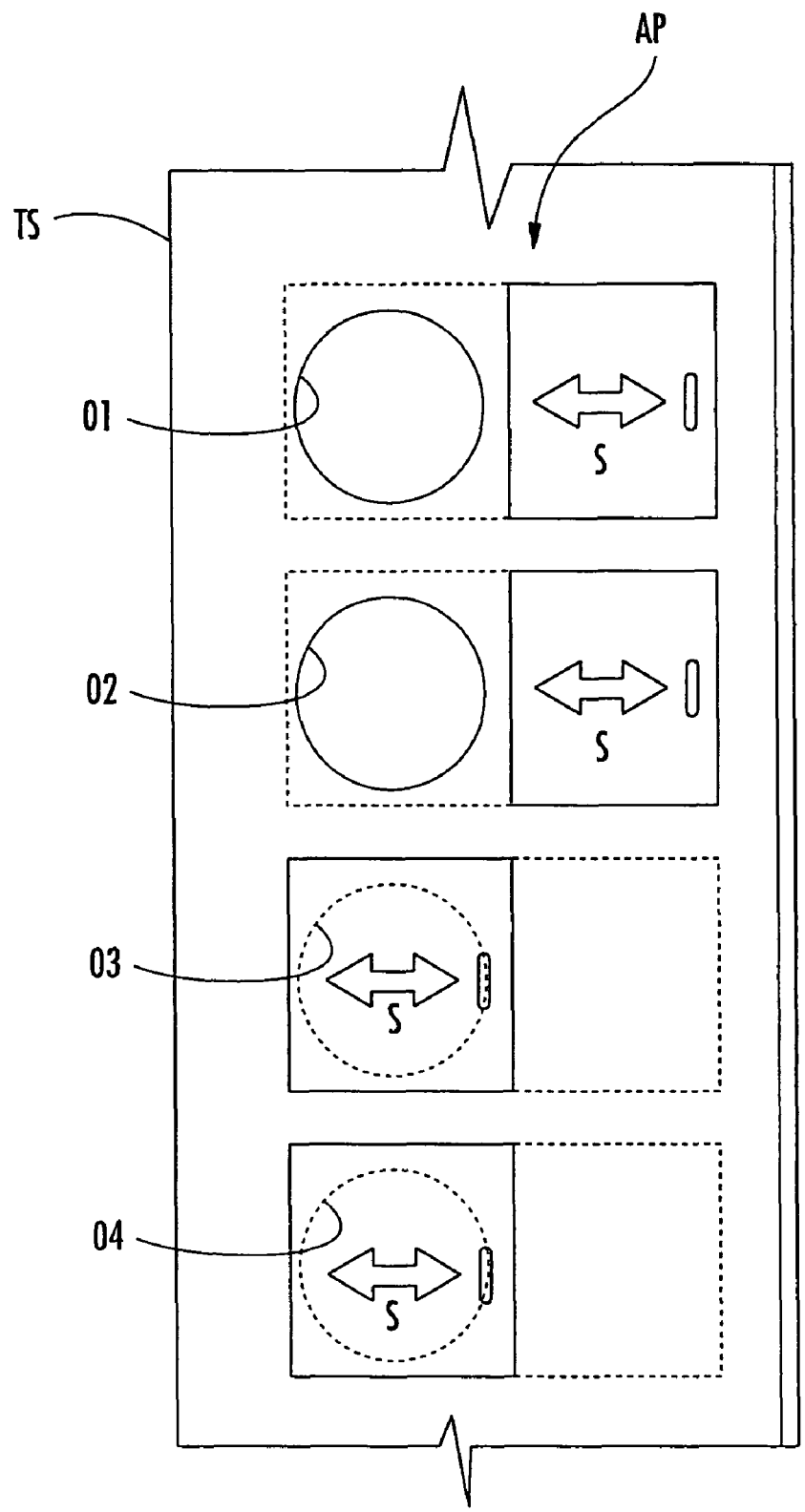
FIGS. 6a and 6b illustrate top plan views other embodiments of apertures according to FIGS. 4a, 4b and 4c.
Figure 6B:
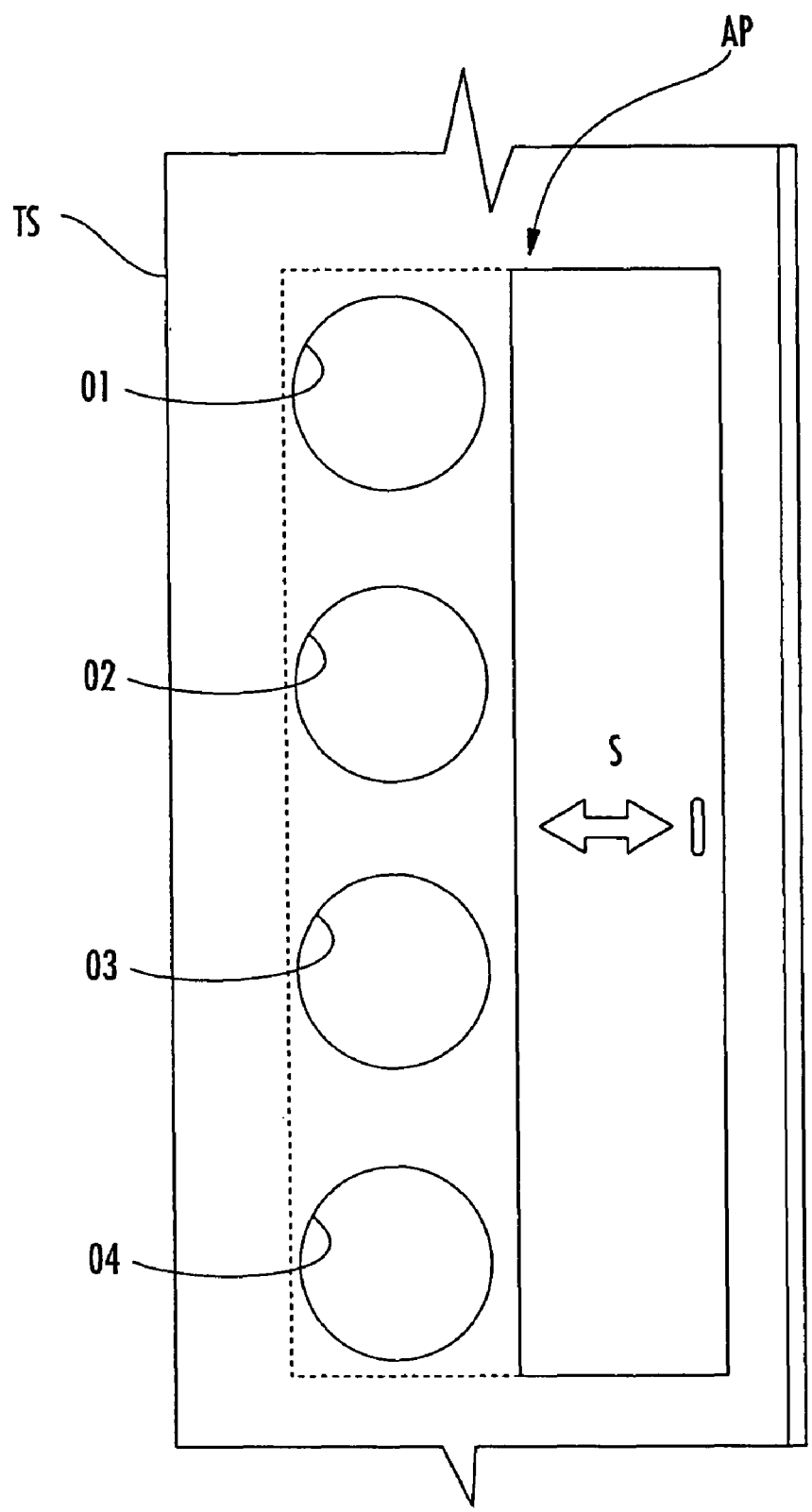

FIGS. 6a and 6b illustrate another embodiment of aperture AP, wherein the amount of exhaust EX directed from engine E to the interior of handle H is regulated by one or more apertures AP located within or generally comprised as a part of tubular structure TS or handle H. Specifically, openings (e.g., openings 01, 02, 03, and 04) in tubular structure TS or handle H can be selectively opened or closed by slidably opening and closing aperture AP, for instance by opening and closing one or more shutters S of aperture AP. As illustrated by FIG. 6a, a plurality of openings can be individually opened or closed. Alternatively, FIG. 6b illustrates a plurality of openings that can be simultaneously opened or closed by sliding aperture AP.

Apertures AP as illustrated in FIGS. 5, 6a and 6b effectively regulate exhaust EX flowing in the interior space of handle H, whereby the transfer of thermal energy from exhaust EX to handle H is regulated, thus controlling the heating of handle H. Essentially, the opening of apertures AP decreases the amount of exhaust EX directed through the interior of handle H, thereby decreasing the transfer of thermal energy to handle H. The regulatory control provided by apertures AP in heating handle H allows the operator to control the heating of handle H and mitigates the potential of overheating handle H.

In addition to regulating handle temperature, aperture AP can be selectively opened and closed to regulate back-pressure on engine E exerted by exhaust EX. As can be appreciated by one skilled in the art, exhaust back-pressure can limit engine performance, thus aperture AP will provide the ability to relieve exhaust back-pressure on engine E by selectively manipulating aperture AP.

Figure 7A:
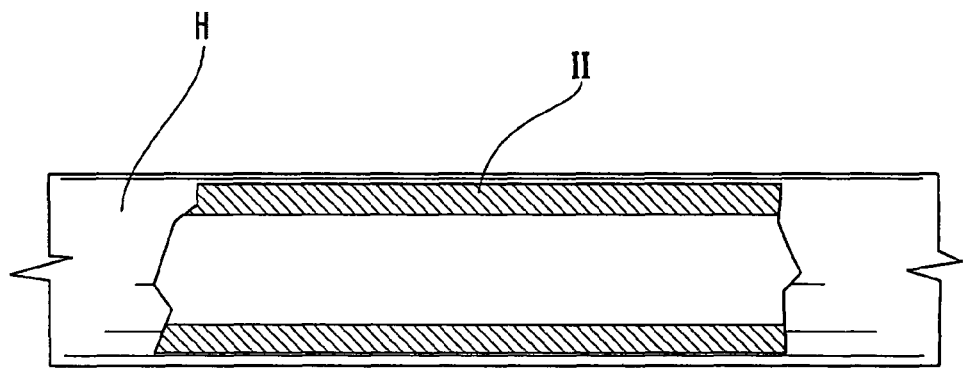
FIGS. 7a and 7b are cut-away side views of a handle of the snowblower illustrating embodiments of heat balance along the handle.
Figure 7B:
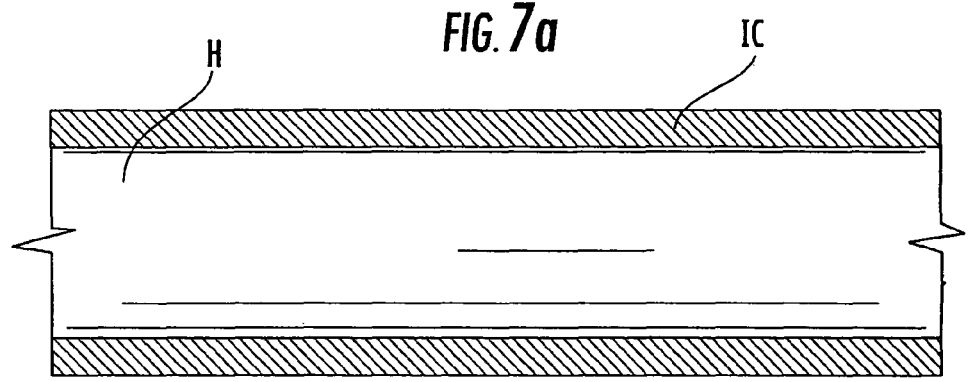

FIGS. 7a and 7b illustrate embodiments of the present subject matter designed to control heat balance along handle H. To minimize the loss of thermal energy, or heat, from exhaust EX prior to reaching the portion of handle H to be gripped by the operator, particularly handle grip HG, handle H can comprise an insulating insert II and/or an insulating coating IC as presented in FIGS. 7a and 7b. As can be appreciated by one skilled in the art, the insulating properties of insulating insert II and insulating coating IC will minimize exhaust EX thermal energy loss as exhaust EX travels through the interior space of handle H, such that the thermal energy of exhaust EX can effectively heat handle grip HG and/or the desired portion of handle H.

Figure 8:
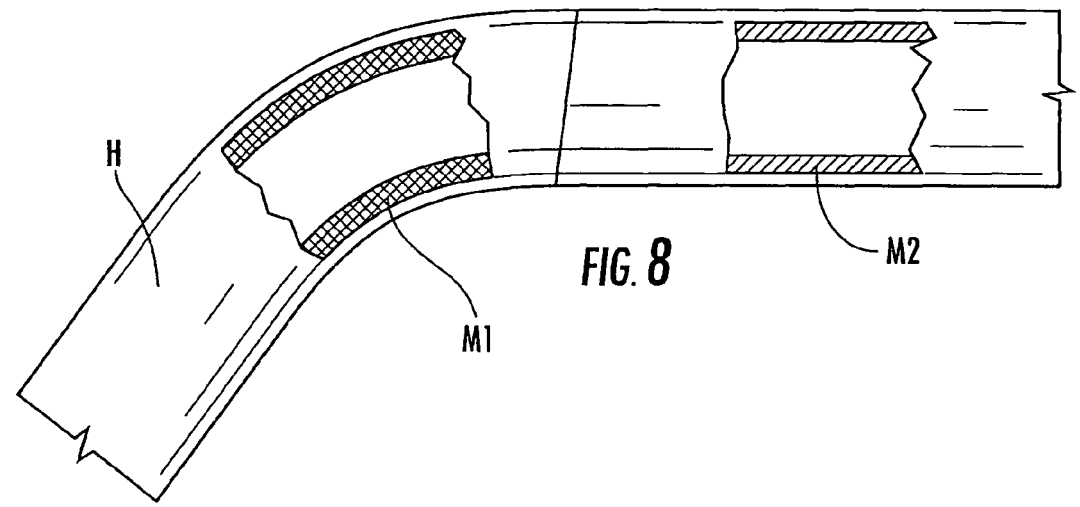
FIG. 8 is a cut-away side view of a handle of the snowblower, illustrating another embodiment of heat balance along the handle.

To further enhance heat balance properties of the present subject matter, handle H can comprise materials of variable heat exchange ratios. As illustrated in FIG. 8, handle H can comprise material one M1 and material two M2, both of which have different heat exchange ratios, wherein the heat exchange ratio dictates the transfer of heat across said material. It is envisioned that incorporating materials with variable heat exchange ratios will allow for optimized heating of specific regions of handle H. One non-limiting example is to have the region of handle H extending from the point of entry of exhaust EX to the region of handle grip HG comprise material one M1 and the region of handle H having handle grip HG comprise material two M2, whereby handle grip HG of handle H is substantially warmed by exhaust EX while the rest of handle H is minimally warmed by exhaust EX. As can be appreciated by one skilled in the art, materials with varying heat exchange ratios could be utilized in a plurality of embodiments and combinations thereof to effectively harness the thermal energy of exhaust EX to selectively heat specific regions of handle H, particularly handle grip HG.

Figure 9:
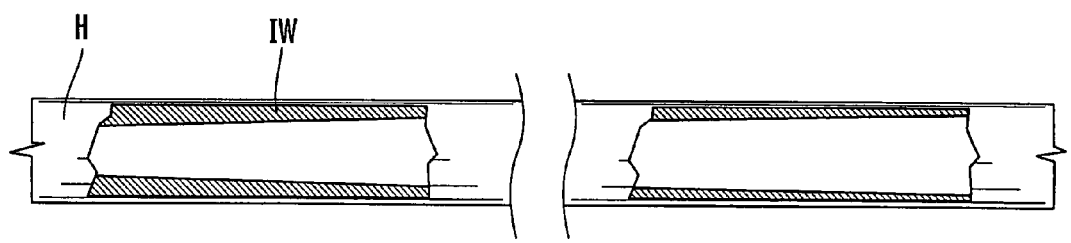
FIG. 9 is a cut-away side view of a handle of the snowblower, illustrating another embodiment of heat balance along the handle.

Still yet another embodiment of the present subject matter is disclosed in FIG. 9, wherein heat balance along handle H is achieved through the internal geometry IG of handle H. It is envisioned that the internal geometry IG of the interior space of handle H can be designed to maximize the effectiveness of exhaust EX in heating selected areas of handle H, such as handle grip HG.

Figure 10:
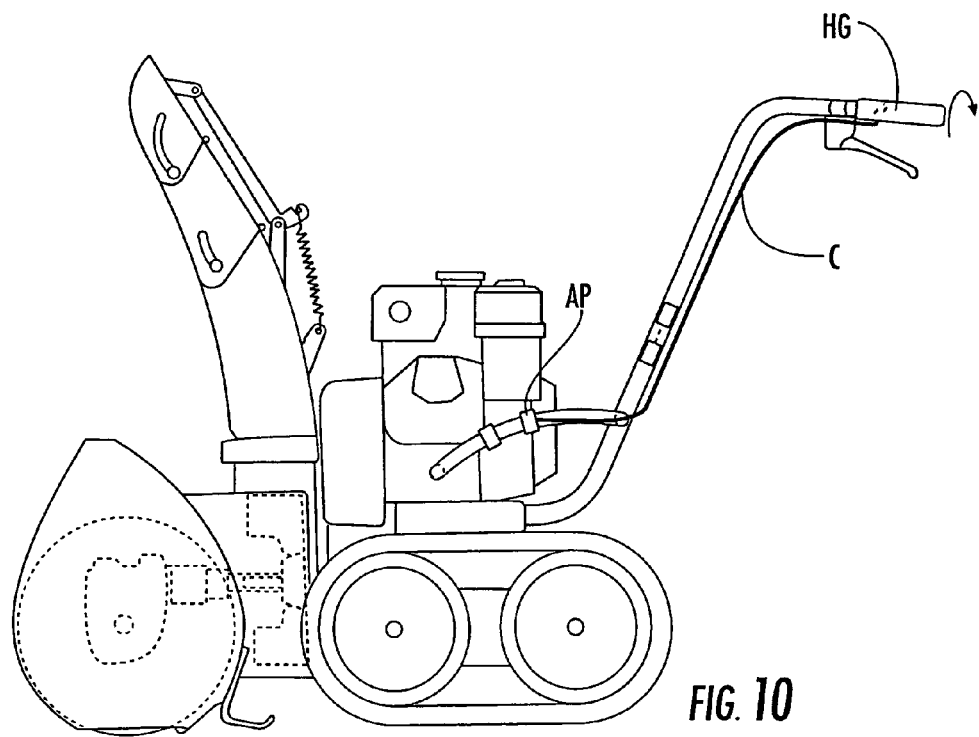
FIG. 10 is a side elevation view of an embodiment of an apparatus to heat the handle(s) of a snowblower, illustrating aperture control.
Figure 17:
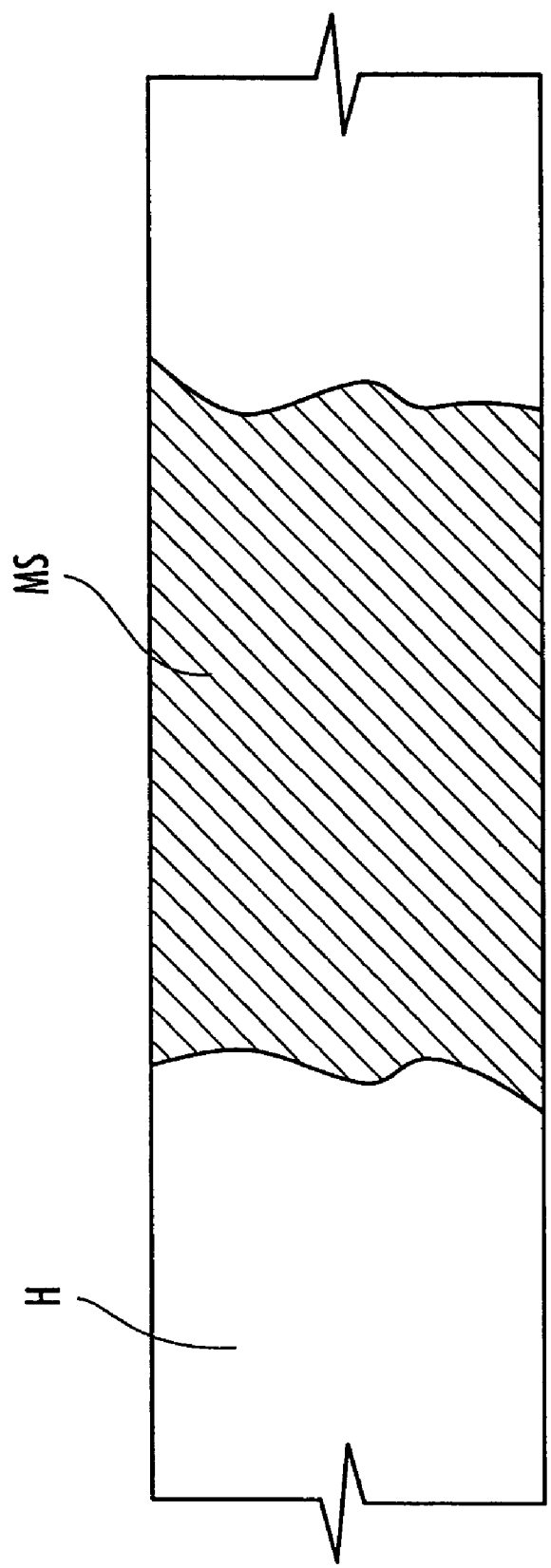

FIG. 10 illustrates another embodiment of the present subject matter wherein handle grip HG is operatively linked to one or more apertures AP through a linking member such as a cable C. Operatively linking handle grip HG to aperture AP will allow operator control of aperture AP thereby allowing operator control of handle heating. As can also be appreciated by one of skill in the art, aperture AP can be operatively linked to a plurality of operator control apparatuses, i.e. a rotatable handle grip, a control lever, a switch, etc., so that the operator can control the opening and closing of one or more apertures AP and effectively control handle H heating. As a non-limiting example and as illustrated in FIG. 10, handle grip HG can be operatively linked to aperture AP, wherein handle grip HG is rotatable on handle H, wherein the rotation of handle grip HG manipulates aperture AP through cable C.

A further embodiment of the present subject matter is illustrated in FIGS. 2, 3b and 11, wherein handle H comprises a muffling structure MS, such that as exhaust EX flows through the interior of handle H the engine noise associated with exhaust EX is at least partially attenuated. Essentially, handle H effectively becomes a muffler with the incorporation of this embodiment. As illustrated in FIGS. 2 and 3b, muffling structure MS can comprise a muffling structure attached to handle H, or alternatively, muffling structure MS can comprise a muffling structure or material comprised within or associated with handle H as illustrated in FIG. 11. Further, muffling structure MS can comprise any apparatus, material or structure that effectively muffles or attenuates noise and can be associated with and/or incorporated into handle H in a plurality of locations.

It can therefore seen from the foregoing that the embodiments disclosed herein provide apparatuses and methods to heat the handle(s) of a snowblower or like power equipment by directing the exhaust gases produced by the internal combustion engine to the handle(s) of the snowblower.

It will be understood that various details of the disclosed subject matter may be changed without departing from the scope of the disclosed subject matter. Furthermore, the foregoing description is for the purpose of illustration only, and not for the purpose of limitation.

What is claimed is:

1. A heating apparatus for power equipment comprising:
    an internal combustion engine capable of producing exhaust from an exhaust source;
    a handle for controlling the power equipment, the handle having an interior and the handle comprising a handle grip at a grip end of the handle to be gripped by an operator and at least one handle leg, one end of the handle leg being connected to the handle grip and another end of the handle leg being directly connected to the power equipment, the grip end of the handle including an operator control device; and
    a tubular structure directly connected to the exhaust source of the engine and to the handle, the exhaust of the engine being in communication with the interior of the handle through the tubular structure for heating the handle;
    wherein the tubular structure has one or more adjustable apertures, and the operator control device is movable to control the adjustable apertures.

2. The apparatus according to claim 1, wherein the tubular structure is attachable to the exhaust source of the engine at a plurality of locations on the engine.

3. The apparatus according to claim 1, wherein the tubular structure comprises a flexible heat-resistant hose.

4. The apparatus according to claim 1, wherein the one or more adjustable apertures are configured for regulating the amount of exhaust in communication with the interior of the handle.

5. The apparatus according to claim 4, wherein regulating the amount of exhaust in communication with the interior of the handle controls handle heating.

6. The apparatus according to claim 4, wherein regulating the amount of exhaust in communication with the interior of the handle controls exhaust back pressure on the engine.

7. The apparatus according to claim 1, wherein the handle is configured for attenuating exhaust noise.

8. The apparatus according to claim 7, wherein the handle comprises a muffling structure.

9. The apparatus according to claim 1, wherein the handle is configured for controlling heat balance.

10. The apparatus according to claim 9, wherein the handle comprises materials with variable heat exchange ratios for controlling heat balance.

11. The apparatus according to claim 9, wherein the handle comprises an interior space with an internal geometry designed to control heat balance.

12. The apparatus according to claim 9, wherein the handle comprises an insulating coating for controlling heat balance.

13. The apparatus according to claim 9, wherein the handle comprises an insulating insert for controlling heat balance.

14. The apparatus according to claim 1, wherein the handle comprises a continuous hollow pipe forming a substantially U-shaped handle with a proximal end section comprising the handle grip to be gripped by the operator and two spaced-apart legs attached to the power equipment.

15. The apparatus according to claim 1, wherein the at least one handle leg comprises two hollow pipes extending at an upward angle and rearward from the power equipment.

16. The apparatus according to claim 1, wherein the operator control device comprises a rotatable handle grip configured to control at least one of the adjustable apertures.

17. The apparatus according to claim 16, wherein the rotatable handle grip is operably linked to at least one of the one or more adjustable apertures through a cable.

18. An apparatus to heat the handle of a snowblower comprising:
   a snowblower;
   an internal combustion engine capable of producing exhaust from an exhaust source;
   a handle directly connected to the snowblower for controlling the snowblower, the handle having an interior and the handle comprising a handle grip at a grip end of the handle to be gripped by an operator; at least one handle leg connected to the handle grip, the at least one handle leg comprising a first material and the handle grip comprising a second material, the first material and the second material having different heat exchange ratios; and
   the exhaust of the engine being in communication with the interior of the handle through a tubular structure directly connected to the exhaust source of the engine and to the handle for heating the handle;
   wherein the tubular structure has one or more adjustable apertures; and
   wherein the handle grip is substantially warmed by the exhaust of the engine and the at least one handle leg is minimally warmed by the exhaust.

19. The apparatus according to claim 18, wherein the tubular structure is attachable to the engine at a plurality of locations on the engine.

20. The apparatus according to claim 18, wherein the tubular structure comprises a flexible heat-resistant hose.

21. The apparatus according to claim 18, wherein the handle can have one or more adjustable apertures.

22. The apparatus according to claim 18 or claim 21, wherein the one or more adjustable apertures are configured to regulate the amount of exhaust in communication with the interior of the handle.

23. The apparatus according to claim 18, wherein regulating the amount of exhaust in communication with the interior of the handle controls handle heating.

24. The apparatus according to claim 18, wherein regulating the amount of exhaust in communication with the interior of the handle controls exhaust back pressure on the engine.

25. The apparatus according to claim 18, wherein the handle is configured for attenuating exhaust noise.

26. The apparatus according to claim 18, wherein the handle comprises a muffling structure.

27. The apparatus according to claim 18, wherein the handle is configured for controlling heat balance.

28. The apparatus according to claim 27, wherein the handle comprises materials with variable heat exchange ratios for controlling heat balance.

29. The apparatus according to claim 27, wherein the handle comprises an internal space with an interior geometry designed to control heat balance.

30. The apparatus according to claim 27, wherein the handle comprises an insulating coating for controlling heat balance.

31. The apparatus according to claim 27, wherein the handle comprises an insulating insert for controlling heat balance.

32. The apparatus according to claim 18, wherein the handle comprises a continuous hollow pipe forming a substantially U-shaped handle bar with a proximal end section comprising the handle grip to be gripped by the operator and two spaced-apart legs attached to the snowblower.

33. The apparatus according to claim 18, wherein the at least one handle leg comprises two hollow pipes extending at an upward angle and rearward from the snowblower.

34. The apparatus according to claim 18 or claim 21, wherein the grip end of the handle comprises a rotatable handle grip configured to control at least one of the one or more adjustable apertures.

35. The apparatus according to claim 34, wherein the rotatable handle grip is operably linked to at least one of the one or more adjustable apertures through a cable.

36. A method for heating a handle on power equipment, comprising:
   providing an internal combustion engine producing exhaust;
   providing a handle for controlling the power equipment, the handle having an interior and the handle comprising two handle legs and a handle grip at a grip end of the handle to be gripped by an operator, wherein one end of each of the handle legs directly connected to the power equipment;
   directing the exhaust produced by the engine through a tubular structure directly connected to the engine and to one of the two handle leas of the handle;
   adjusting one or more adjustable apertures on the tubular structure to regulate an amount of exhaust directed through the tubular structure;
   directing the exhaust from the tubular structure to the interior of one of the two handle legs and to the handle grip whereby the exhaust heats the handle grip; and
   directing the exhaust through the other of the two handle legs and away from the handle grip.

37. The method according to claim 36, wherein the regulation of the amount of exhaust directed to the interior of the handle controls handle heating.

38. The method according to claim 36, wherein the regulation of the amount of exhaust directed to the interior of the handle controls exhaust back-pressure on the engine.

39. The method according to claim 36, wherein heat balance along the handle is achieved through one or more of the following: materials with variable heat exchange ratios, the internal geometry of the handle, an insulating coating on the handle or an insulating insert inside the handle.

40. The method according to claim 36, wherein the power equipment is a snowblower.

41. The apparatus according to claim 9, wherein the at least one handle leg comprises a first material and the handle grip comprises a second material, the first material and the second material having different heat exchange ratios whereby the handle grip is substantially warmed by the exhaust of the engine and the at least one handle leg is minimally warmed by the exhaust.

42. The apparatus according to claim 14, wherein the tubular structure connects the engine to a first of the two spaced-apart legs, the exhaust of the engine being in communication with the interior of the first leg for passage through the first leg to the handle grip, through the handle grip, and through the second of the two spaced-apart legs away from the handle grip.

* * * * *